United States Patent
Wei et al.

(10) Patent No.: US 10,402,377 B1
(45) Date of Patent: *Sep. 3, 2019

(54) DATA RECOVERY IN A DISTRIBUTED COMPUTING ENVIRONMENT

(71) Applicant: Amazon Technologies, Inc., Seattle, WA (US)

(72) Inventors: Danny Wei, Seattle, WA (US); Lakshmi N. Pallikila, Seattle, WA (US); James Andrew Trenton Lipscomb, Seattle, WA (US); Yan V. Leshinsky, Kirkland, WA (US); Tarun Goyal, Seattle, WA (US); Kerry Q. Lee, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 405 days.

This patent is subject to a terminal disclaimer.

(21) Appl. No.: 15/224,444

(22) Filed: Jul. 29, 2016

Related U.S. Application Data

(63) Continuation of application No. 13/633,612, filed on Oct. 2, 2012, now Pat. No. 9,405,815.

(51) Int. Cl.
*G06F 16/182* (2019.01)
*G06F 16/27* (2019.01)
*G06F 16/11* (2019.01)
*G06F 11/14* (2006.01)

(52) U.S. Cl.
CPC ...... *G06F 16/1844* (2019.01); *G06F 11/1469* (2013.01); *G06F 16/113* (2019.01); *G06F 16/122* (2019.01); *G06F 16/27* (2019.01)

(58) Field of Classification Search
None
See application file for complete search history.

(56) References Cited

U.S. PATENT DOCUMENTS

| | | | |
|---|---|---|---|
| 6,983,295 | B1 | 1/2006 | Hart |
| 7,133,982 | B2 | 11/2006 | Werner et al. |
| 7,613,806 | B2 | 11/2009 | Wright et al. |
| 8,224,781 | B2 | 7/2012 | Popovski et al. |
| 9,405,815 | B1 | 8/2016 | Wei et al. |
| 2004/0215640 | A1 | 10/2004 | Bamford et al. |
| 2005/0262170 | A1 | 11/2005 | Girkar et al. |
| 2008/0028009 | A1 | 1/2008 | Ngo |
| 2010/0169575 | A1 | 7/2010 | Masaki et al. |
| 2010/0281229 | A1 | 11/2010 | Iwamura et al. |

(Continued)

OTHER PUBLICATIONS

U.S. Appl. No. 13/633,612, "Final Office Action", dated Jul. 8, 2014, 30 pages.

(Continued)

*Primary Examiner* — James Trujillo
*Assistant Examiner* — John J Morris
(74) *Attorney, Agent, or Firm* — Kilpatrick Townsend & Stockton LLP

(57) ABSTRACT

A computing system recovers volumes in a distributed computing environment while reducing downtime of storage servers. In an embodiment, a storage server contacts a control plane after a storage failure has occurred. If the storage server hosts an authoritative copy of an offline volume, the storage server is requested to restore the volume. Non-authoritative volumes are removed from the storage server and the storage server provides read access to the restored volume while resuming storage services.

20 Claims, 10 Drawing Sheets

(56) References Cited

U.S. PATENT DOCUMENTS

2012/0089576 A1   4/2012   Singla et al.
2012/0233123 A1   9/2012   Shisheng et al.
2013/0262393 A1   10/2013  Mrak et al.
2013/0332770 A1   12/2013  Thiel et al.

OTHER PUBLICATIONS

U.S. Appl. No. 13/633,612 , "Non-Final Office Action", dated Jan. 16, 2014, 23 Pages.
U.S. Appl. No. 13/633,612 , "Non-Final Office Action", dated Sep. 11, 2015, 37 pages.
U.S. Appl. No. 13/633,612 , "Notice of Allowance", dated Apr. 8, 2016, 23 pages.

US 10,402,377 B1

DATA RECOVERY IN A DISTRIBUTED COMPUTING ENVIRONMENT

CROSS REFERENCE TO RELATED APPLICATIONS

This application is a continuation of U.S. patent application Ser. No. 13/633,612, filed Oct. 2, 2012, issued as U.S. Pat. No. 9,405,815, issued Aug. 2, 2016, titled "DATA RECOVERY IN A DISTRIBUTED COMPUTING ENVIRONMENT", the contents of which are herein incorporated in their entireties.

BACKGROUND

Data centers provide computing resources for use by one or more clients. These services may include computing, storage and networking services. For example, a data center may provide a machine to host an application, storage to store application data and networking to enable communication between the machine and the storage. By making use of the data center services a customer may pay for computing and/or storage use rather than purchasing anticipated hardware needs. This enables a customer to expand and contract use of computing services according to demand. For example, an application may be configured to request more storage as needed rather than a developer or administrator monitoring and anticipating use.

BRIEF DESCRIPTION OF THE DRAWINGS

Various embodiments in accordance with the present disclosure will be described with reference to the drawings, in which.

DETAILED DESCRIPTION

Figure 1:
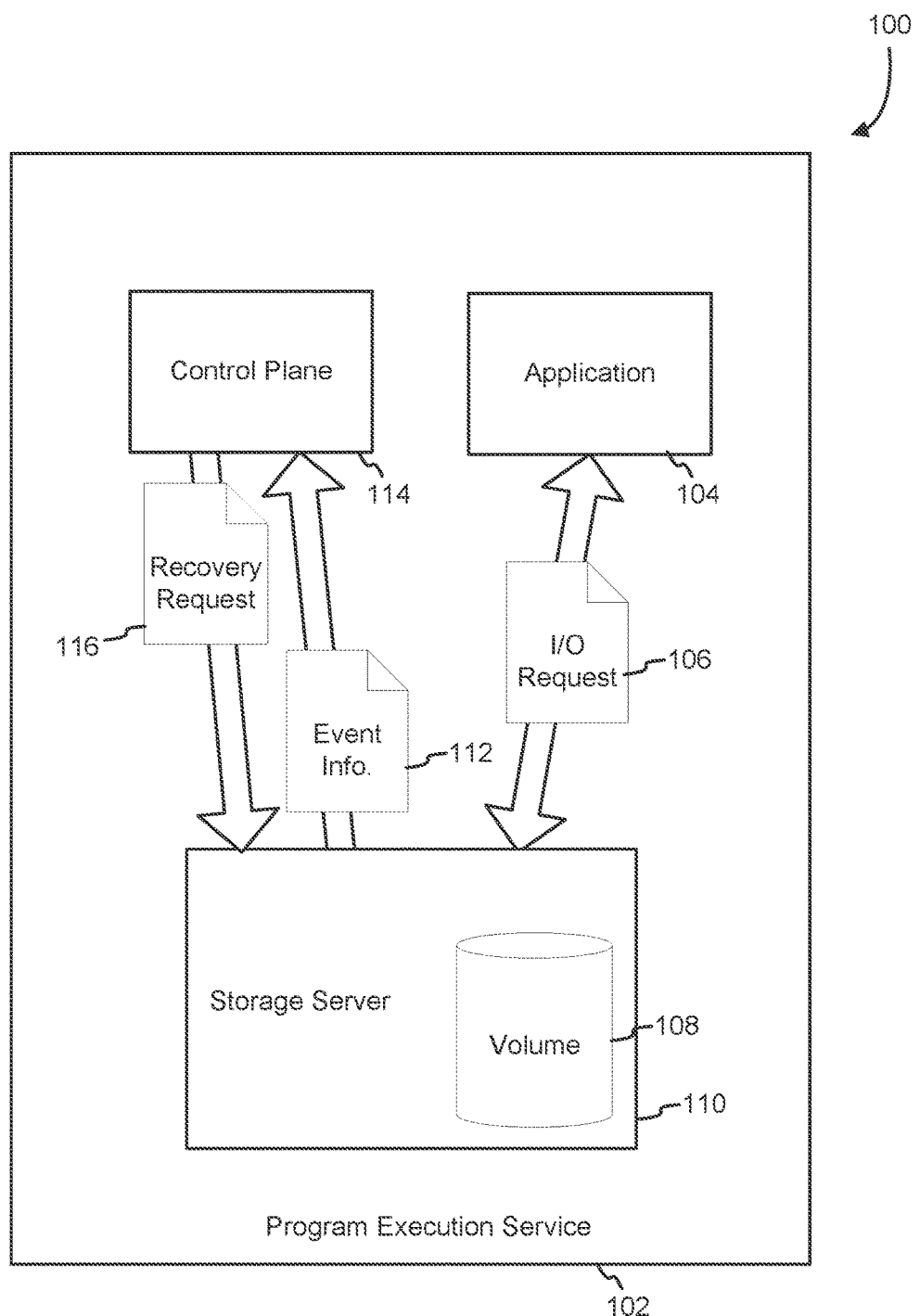
FIG. 1 shows an illustrative example of a volume recovery system in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to recovering volumes in a distributed computing environment while reducing downtime of storage servers. In some embodiments, a storage server contacts a computer system (succinctly referred to as a control plane) after a storage failure has occurred. If the storage server hosts an authoritative copy of an offline volume, the storage server is requested to restore the volume. Non-authoritative volumes are removed from the storage server and the storage server provides read access to the restored volume and provides remaining free space for provisioning new volumes. For example, a power outage at a data center may be caused by severe weather such that the entire data center is without power for a time. Upon restoring power, a storage server detects the failure and scans its storage for volumes. The detected volumes from the scan are reported to the control plane. The control plane determines which, if any, volumes should be restored because the volumes are an authoritative copy of customer data. An authoritative copy of customer data may include customer data that is not currently available from other storage systems. The control plane may inform the storage server which volumes should be restored and which volumes may be deleted. The storage server may restore the volumes into a read-only state and remaining storage space on the storage server may be made available to provision other volumes. In some embodiments, non-restored volumes are deleted and the space made available to host other volumes.

The control plane may also pause input/output requests (I/O requests) directed to the volume. Paused requests may have a long latency, but are neither accepted nor denied until unpaused. The storage server may then provide read-only access to the restored volume until a customer has reviewed, validated and/or enabled the volume for use. Once enabled, the paused requests may be unpaused. In some embodiments, the control plane may verify that no data was lost and automatically re-enable the volume without customer intervention.

In some embodiments, data may be merged from multiple sources. For example, a recent snapshot of the volume may be used as "clean" data during the restore. The snapshot data may come from a high-durability data store, while the data server provides a low-latency data store. The "clean" data may be merged with changes identified in the recovery of "dirty" data from the volume hosted by the storage server.

A client may monitor and/or direct this restoration process. The client may be provided with administrative read privileges unaffected by the paused I/O requests. The read privileges may allow the client to verify the restored volume integrity. Upon completing the review of the restored volume, the client may re-enable the volume for use, transfer the volume to another data center, archive the volume and/or delete the volume. This client interaction may be performed through an application programming interface and/or a web administration interface.

In one example, a major infrastructure failure occurs, such as a data center power outage. This infrastructure failure may cause many storage servers to detect a storage failure and contact a control plane. Should all storage servers perform a restore operation at the same time, data center resources may become restrained. However, restore operations may be throttled by a control plane. In one embodiment, the control plane answers a portion of the requests received from storage servers. Unanswered storage servers may continue to periodically send messages to the control plane. When the answered storage servers complete restore operations, the process may repeat until the storage servers have been processed.

A control plane provides management services for computing resources in a distributed computing system. Control plane functions may include provisioning and de-provisioning of computing resources, monitoring of computing resources, workflow monitoring and creation, security policy actions, and application programming interface (API) access to management functionality. For example a control plane may provide an API for a client to use that causes a new block storage volume to be created and attached to an existing virtual machine.

Volumes may be virtualized as well as physical. For example a virtual volume may be expanded or contracted as needed, such that the virtual volume may span several physical volumes. A physical volume may be a set of space allocated on physical media. For example, a physical volume may be a percentage of a hard drive, such as a platter based or solid state drive.

Turning now to FIG. 1, an illustrative example of a volume recovery system 100 in accordance with at least one embodiment is shown. A storage server 110 may recover from going offline by recovering a volume 108 that is identified by a control plane 114 as an authoritative source of data for a customer, such as used a customer application 104. More specifically, a program execution service 102 allows a customer to provision and control various computing resources. These computing resources may include virtual storage, such as a block storage service that may include a volume 108 hosted by a storage server 110. Other program execution services may include virtual machine provisioning to support an application 104 and configurable networking to support I/O requests 106 between the application 104 and the volume 108. These computing resources and services may be managed by a control plane 114.

If an event occurs that causes disruption to the storage server 110 (also referred to as a "recovery event" or "recovery triggering event"), such as a power outage or network failure, the storage server 110 may transition into a recovery state. During the recovery state, a storage server 110 may scan local volumes 108. In one embodiment, the scanning is used to determine volume identifiers and volume health. The storage server 110 may periodically attempt contact with the control plane 114 to report the results of the scan as event information 112 and receive instruction regarding the volumes 108. The control plane 114 may receive a report from a storage server 110 and determine if the storage server 110 hosts a volume in need of recovery. In one embodiment, a copy of the volume 108 may exist on another storage server 110 that was not affected by the event. Therefore the volume may be outdated and redundant. The control plane 114 may safely instruct the storage server 110 to delete the volume 108. On the other hand, if the volume 108 is the only authoritative copy in existence, the control plane 114 may instruct the storage server 110 through a recovery request 116 to recover the volume 108. I/O requests 106 to the volume 108 may be paused during the recovery process.

During and/or after recovery of the volume, the storage server 110 may continue normal operations of receiving and servicing provisioned volumes. The recovered volume may be placed in a read-only state such that normal I/O requests are paused. In one embodiment, the volume may be re-enabled to process I/O requests if it is determined that there was no loss of data. In other embodiments, the volume may remain "paused" until a customer makes a final decision about the volume. A customer may, for example, choose to verify, perform a snapshot of, re-enable and/or delete the volume. These requests from the customer may be received through various channels, such as an application programming interface (API) and/or a web interface. The requests may also be made by the customer directly through interaction with a computing resource or programmatically through use of an instruction channel, such as an API.

For example, a network outage may occur at a data center because of a hardware bug in multiple routers' hardware. The storage server 108 may discover the network is down and transition into a recovery state. Because of the down network, I/O requests 106 to the storage server 110 may be paused. The storage server 108 may scan its local hard drives to determine which volumes 108 it hosts and the health of the volumes 108. Periodically, the storage server 108 may attempt to send failure event information 112 to the control plane 114 that may include information on the volumes and the reason for the transition into recovery mode, such as the network outage. In some embodiments, the storage server 110 may simply wait to detect the network and then send the event information message 116. When the network becomes available, the control plane 114 may receive the event information 112 and determine if the volume 108 should be recovered as an authoritative source of data. The control plane 114 may send instructions to recover volumes containing authoritative sources of data and delete duplicate and/or outdated volumes. During or after the recovery of the recovered volumes 108, the storage server may resume normal servicing and provisioning of volumes while hosting the recovered volumes 108. The status of recovered volumes 108 may be communicated to a customer such that the customer may verify the data on the recovered volume 108 and re-enable the volume for use (including unpausing the I/O requests 106).

It should be recognized that while specific examples described herein use block storage services and/or high durability data stores, other storage services and media may be applicable and/or used. For example, caches, relational databases, NoSQL databases, object storage, block storage and other storage paradigms may also be used.

Figure 2:
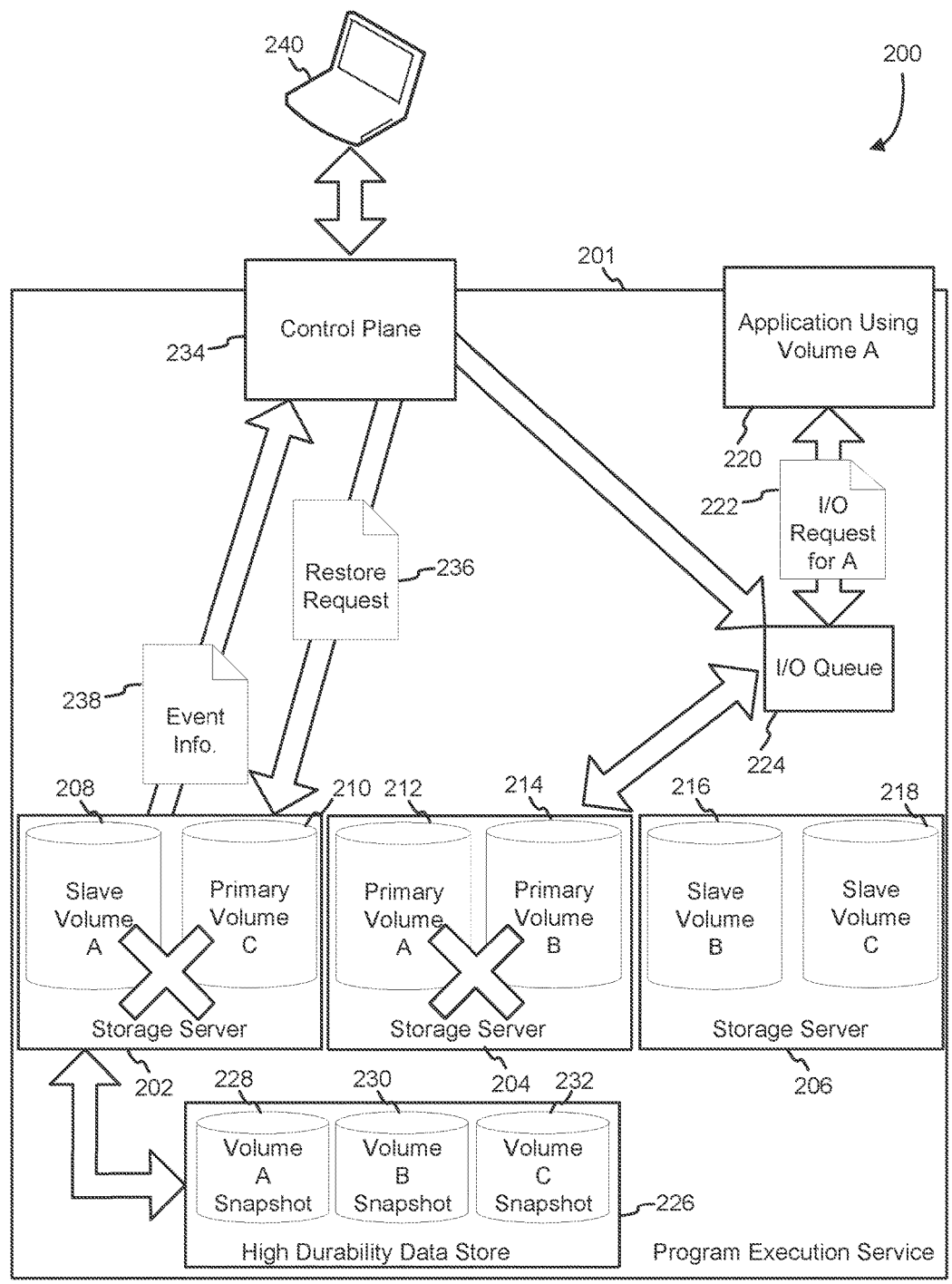
FIG. 2 shows an illustrative example of an alternate embodiment of a volume recovery system in accordance with at least one embodiment.

Turning now to FIG. 2, an illustrative example of an alternate embodiment of a volume recovery system 200 in accordance with at least one embodiment is shown. Two storage servers 202, 204 responding to a failure contact a control plane 234 and receive instructions as to which volume 208 is to be restored using snapshot data 228 from a high durability data store 226 and which volumes 210, 212, 214 are to be deleted. More specifically, a program execution service 201 provides computing resources and services that include application servers to support application 220, block storage services to service volumes A, B, C through storage servers 202, 204, 206 and high durability data storage 226 for snapshots. Each volume A, B, C may actually consist of a primary volume 210, 212, 214 and slave volume 208, 216, 218 to improve durability. A slave volume 208, 216, 218 may intercept write commands for the primary volume 210, 212, 214 such that the slave volume 208, 216, 218 mirrors the primary volume 210, 212, 214. Snapshots 228, 230, 232 of a volume may be periodically taken and placed in a high durability data store 226 such that data in volume A, B, C is further protected from failures. An application 220 may communicate with volume A through I/O requests 222 that are placed in an I/O queue 224 that services volume A.

However, an event may occur that interrupts storage servers 202 and 204, such as a power outage, that prevents I/O queue 224 from delivering I/O requests to volume A. In contrast, storage server 206 may not have been interrupted. Slave volume B 216 and slave volume C 218 may revert to primary volumes as primary volume B 214 and primary volume C 210 become unreachable. Slave volumes for volumes 216 and 218 may then be provisioned on other active servers to maintain durability of the volumes. Upon the ending of the event, such as the return of power, storage servers 202 and 204 may periodically attempt to contact the control plane 234. Here, storage server 202 is the first to contact the control plane 234. Storage server 202 sends event information 238, such as the detected problem and the volumes 208, 210 hosted by the storage server 202. The control plane 234 may then determine that primary volume C 210 is already hosted by storage server 206 and not need of restore. However, the control plane 234 may also determine that slave volume A 208 does not have an active counterpart (as storage server 204 is also offline with the primary volume A 212), is the current authoritative volume A and should be restored. In other embodiments, the control plane 234 may wait for the primary volume A 212 before proceeding with a restore operation. A restore request 236 may be returned to storage server 202 with a request to restore slave volume A 208 and delete primary volume C 210. Storage server 202 may come back online and make available the space formerly occupied by primary volume C 210. In some embodiments, a snapshot of restored slave volume A 208 may be taken to ensure survival of the data. In other embodiments, slave volume A 208 is transitioned into a primary volume and a slave volume provisioned to mirror volume 208 such that volume A durability is improved.

Restored slave volume A 208 may be held in a read-only state until a customer 240 or the control plane 234 act to change the state of restored slave volume A 208. In an embodiment, a customer may receive notification from the control plane 234 of a problem through a communication channel, such as email, text message, instant message or phone call. The customer may communicate with the control plane through a customer device 240, such as a laptop or mobile device. The control plane 234 may grant access to the customer device 240 to the recovered slave volume A 208 to review and determine the outcome of the volume. The customer may take such actions as verifying the data, re-enabling the volume, performing a snapshot of the volume and/or deleting the volume. If the customer re-enables the restored slave volume A 208, the slave volume A 208 may be transitioned into a primary volume and a slave volume provisioned to complete volume A. Application 220 may then resume communication with volume A and paused I/O requests 222 may be released to volume A. In some embodiments, the control plane 234 may determine that no data loss occurred, such as a match with a recent snapshot or a match between a primary volume A 212 and slave volume A 208. The control plane 234 may then automatically re-enable the slave volume A 208 and unpause the I/O requests 222 for the volume A by releasing the I/O requests 222 from the I/O queue 224. In one embodiment, data from a snapshot 228 may be used as a base of "clean" data for the restore. "Dirty" data from the restored slave volume A 208 may then be applied such that any corruption of the "dirty" data may not affect the "clean" data. In another embodiment, if restored volume A 208 does not receive interaction within a certain amount of time, the restored volume A 208 may be stored in the high durability data store 226 as a snapshot.

Regarding storage server 204 coming back online, several choices may be made by the control plane. In one embodiment, the storage server sends event information 238 that includes the hosted volumes 212, 214. As 212, 214 are duplicates of existing volumes, the control plane 234 may send instructions to delete the volumes. Storage server 204 may then delete the volumes and resume offering storage services. In another embodiment, primary volume A 212 may be used to stitch together data to remedy any corruption, restore missing data and/or ensure the integrity of slave volume A 208. The storage server 204 may then resume normal operations providing storage services.

Figure 3:
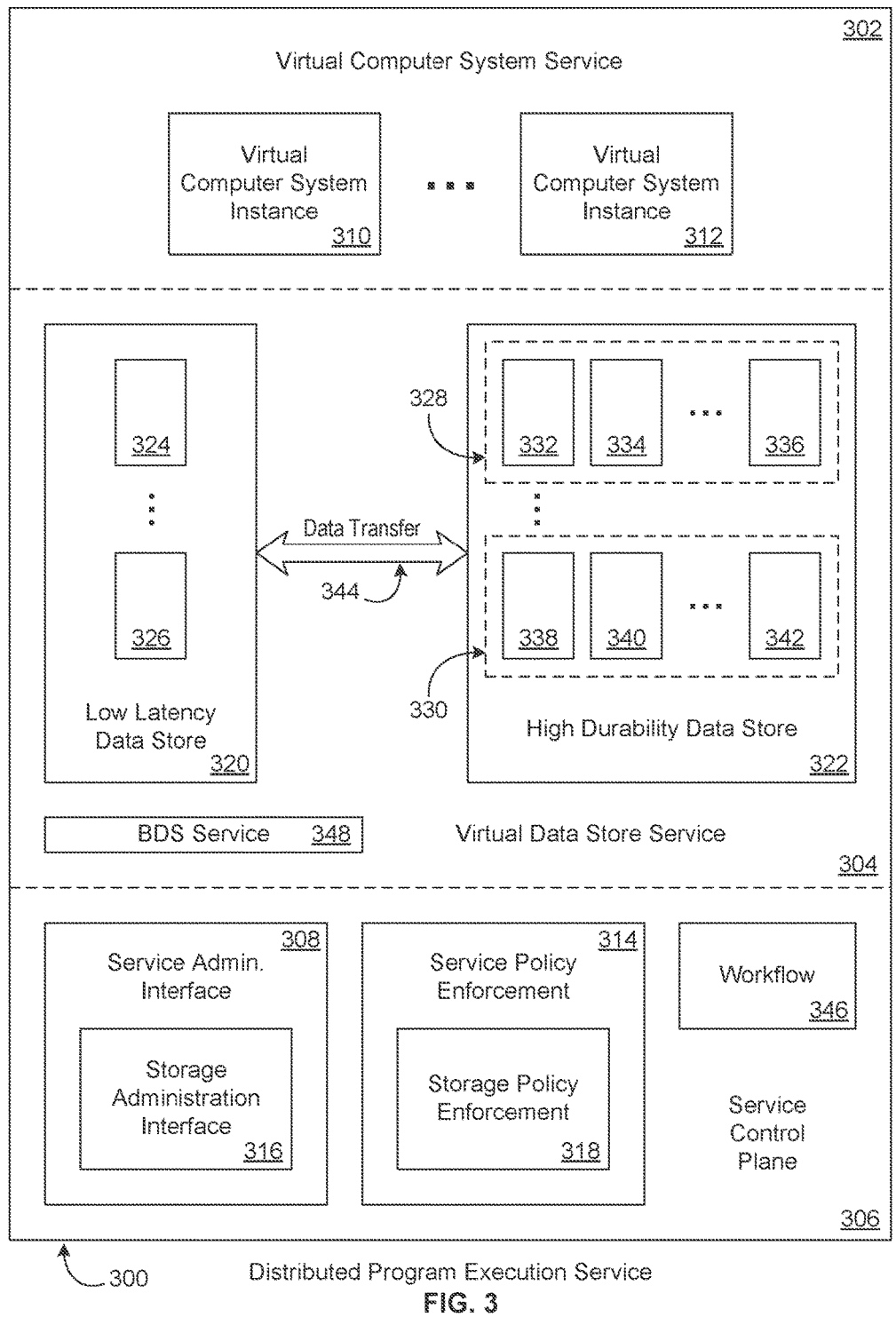
FIG. 3 shows an illustrative example of a distributed program execution service environment in accordance with at least one embodiment.

In at least one embodiment, one or more aspects of the environment 100 and 200 may incorporate and/or be incorporated into a distributed program execution service. FIG. 3 depicts aspects of an example distributed program execution service 200 in accordance with at least one embodiment. The distributed program execution service 300 provides virtualized computing services, including a virtual computer system service 302 and a virtual data store service 304, with a wide variety of computing resources interlinked by a relatively high speed data network. Such computing resources may include processors such as central processing units (CPUs), volatile storage devices such as random access memory (RAM), nonvolatile storage devices such as flash memory, hard drives and optical drives, servers such as the storage server 110 and the application server 104 described above with reference to FIG. 1, one or more data stores such as the volume 108 of FIG. 1, as well as communication bandwidth in the interlinking network. The computing resources managed by the distributed program execution service 300 are not shown explicitly in FIG. 3 because it is an aspect of the distributed program execution service 300 to emphasize an independence of the virtualized computing services from the computing resources that implement them.

The distributed program execution service 300 may utilize the computing resources to implement the virtualized computing services at least in part by executing one or more programs, program modules, program components and/or programmatic objects (collectively, "program components") including and/or compiled from instructions and/or code specified with any suitable machine and/or programming language. For example, the computing resources may be allocated, and reallocated as necessary, to facilitate execution of the program components, and/or the program components may be assigned, and reassigned as necessary, to the computing resources. Such assignment may include physical relocation of program components, for example, to enhance execution efficiency. From a perspective of a user of the virtualized computing services, the distributed program execution service 300 may supply computing resources elastically and/or on-demand, for example, associated with a per resource unit commodity-style pricing plan.

The distributed program execution service 300 may further utilize the computing resources to implement a service control plane 306 configured at least to control the virtualized computing services. The service control plane 306 may include a service administration interface 308. The service administration interface 308 may include a Web-based user interface configured at least to enable users and/or administrators of the virtualized computing services to provision, de-provision, configure and/or reconfigure (collectively, "provision") suitable aspects of the virtualized computing services. For example, a user of the virtual computer system service 302 may provision one or more virtual computer system instances 310, 312. The user may then configure the provisioned virtual computer system instances 310, 312 to execute the user's application programs. The ellipsis between the virtual computer system instances 310 and 312 indicates that the virtual computer system service 302 may support any suitable number (e.g., thousands, millions, and more) of virtual computer system instances although, for clarity, only two are shown.

The service administration interface 308 may further enable users and/or administrators to specify and/or re-specify virtualized computing service policies. Such policies may be maintained and enforced by a service policy enforcement component 314 of the service control plane 306. For example, a storage administration interface 316 portion of the service administration interface 308 may be utilized by users and/or administrators of the virtual data store service 304 to specify virtual data store service policies to be maintained and enforced by a storage policy enforcement component 318 of the service policy enforcement component 314. Various aspects and/or facilities of the virtual computer system service 302 and the virtual data store service 304 including the virtual computer system instances 310, 312, the low latency data store 320, the high durability data store 322, and/or the underlying computing resources may be controlled with interfaces such as application programming interfaces (APIs) and/or Web-based service interfaces. In at least one embodiment, the control plane 306 further includes a workflow component 346 configured at least to interact with and/or guide interaction with the interfaces of the various aspects and/or facilities of the virtual computer system service 302 and the virtual data store service 304 in accordance with one or more workflows.

In at least one embodiment, service administration interface 308 and/or the service policy enforcement component 314 may create, and/or cause the workflow component 346 to create, one or more workflows that are then maintained by the workflow component 346. Workflows, such as provisioning workflows and policy enforcement workflows, may include one or more sequences of tasks to be executed to perform a job, such as provisioning or policy enforcement. A workflow, as the term is used herein, is not the tasks themselves, but a task control structure that may control flow of information to and from tasks, as well as the order of execution of the tasks it controls. For example, a workflow may be considered a state machine that can manage and return the state of a process at any time during execution. Workflows may be created from workflow templates. For example, a provisioning workflow may be created from a provisioning workflow template configured with parameters by the service administration interface 308. As another example, a policy enforcement workflow may be created from a policy enforcement workflow template configured with parameters by the service policy enforcement component 314.

The workflow component 346 may modify, further specify and/or further configure established workflows. For example, the workflow component 346 may select particular computing resources of the distributed program execution service 300 to execute and/or be assigned to particular tasks. Such selection may be based at least in part on the computing resource needs of the particular task as assessed by the workflow component 346. As another example, the workflow component 346 may add additional and/or duplicate tasks to an established workflow and/or reconfigure information flow between tasks in the established workflow. Such modification of established workflows may be based at least in part on an execution efficiency analysis by the workflow component 346. For example, some tasks may be efficiently performed in parallel, while other tasks depend on the successful completion of previous tasks.

The virtual data store service 304 may include multiple types of virtual data store such as a low latency data store 320 and a high durability data store 322. For example, the low latency data store 320 may maintain one or more data sets 324, 326 which may be read and/or written (collectively, "accessed") by the virtual computer system instances 310, 312 with relatively low latency. The ellipsis between the data sets 324 and 326 indicates that the low latency data store 320 may support any suitable number (e.g., thousands, millions, and more) of data sets although, for clarity, only two are shown. For each data set 324, 326 maintained by the low latency data store 320, the high durability data store 322 may maintain a set of captures 328, 330. Each set of captures 328, 330 may maintain any suitable number of captures 332, 334, 336 and 338, 340, 342 of its associated data set 324, 326, respectively, as indicated by the ellipses. Each capture 332, 334, 336 and 338, 340, 342 may provide a representation of the respective data set 324 and 326 at particular moment in time. Such captures 332, 334, 336 and 338, 340, 342 may be utilized for later inspection including restoration of the respective data set 324 and 326 to its state at the captured moment in time. Although each component of the distributed program execution service 300 may communicate utilizing the underlying network, data transfer 344 between the low latency data store 320 and the high durability data store 322 is highlighted in FIG. 2 because the contribution to utilization load on the underlying network by such data transfer 344 can be significant.

For example, the data sets 324, 326 of the low latency data store 320 may be virtual disk files (i.e., file(s) that can contain sequences of bytes that represents disk partitions and file systems) or other logical volumes. The low latency data store 320 may include a low overhead virtualization layer providing access to underlying data storage hardware. For example, the virtualization layer of the low latency data store 320 may be low overhead relative to an equivalent layer of the high durability data store 322. Systems and methods for establishing and maintaining low latency data stores and high durability data stores in accordance with at least one embodiment are known to those of skill in the art, so only some of their features are highlighted herein. In at least one embodiment, the sets of underlying computing resources allocated to the low latency data store 320 and the high durability data store 322, respectively, are substantially disjoint. In a specific embodiment, the low latency data store 320 could be a Storage Area Network ("SAN") target or the like. In this exemplary embodiment, the physical computer system that hosts the virtual computer system instance 310, 312 can send read/write requests to the SAN target.

The low latency data store 320 and/or the high durability data store 322 may be considered non-local and/or independent with respect to the virtual computer system instances 310, 312. For example, physical servers implementing the virtual computer system service 302 may include local storage facilities such as hard drives. Such local storage facilities may be relatively low latency but limited in other ways, for example, with respect to reliability, durability, size, throughput and/or availability. Furthermore, data in local storage allocated to particular virtual computer system instances 310, 312 may have a validity lifetime corresponding to the virtual computer system instance 310, 312, so that if the virtual computer system instance 310, 312 fails or is de-provisioned, the local data is lost and/or becomes invalid. In at least one embodiment, data sets 324, 326 in non-local storage may be efficiently shared by multiple virtual computer system instances 310, 312. For example, the data sets 324, 326 may be mounted by the virtual computer system instances 310, 312 as virtual storage volumes.

Data stores in the virtual data store service 304, including the low latency data store 320 and/or the high durability data store 322, may be facilitated by and/or implemented with a block data storage (BDS) service 348, at least in part. The BDS service 348 may facilitate the creation, reading, updating and/or deletion of one or more block data storage volumes, such as virtual storage volumes, with a set of allocated computing resources including multiple block data storage servers. A block data storage volume, and/or the data blocks thereof, may be distributed and/or replicated across multiple block data storage servers to enhance volume reliability, latency, durability and/or availability. As one example, the multiple server block data storage systems that store block data may in some embodiments be organized into one or more pools or other groups that each have multiple physical server storage systems co-located at a geographical location, such as in each of one or more geographically distributed data centers, and the program(s) that use a block data volume stored on a server block data storage system in a data center may execute on one or more other physical computing systems at that data center.

The BDS service 348 may facilitate and/or implement local caching of data blocks as they are transferred through the underlying computing resources of the distributed program execution service 300 including local caching at data store servers implementing the low latency data store 320 and/or the high durability data store 322, and local caching at virtual computer system servers implementing the virtual computer system service 302. In at least one embodiment, the high durability data store 322 is an archive quality data store implemented independent of the BDS service 348. The high durability data store 322 may work with sets of data that are large relative to the data blocks manipulated by the BDS service 348. The high durability data store 322 may be implemented independent of the BDS service 348. For example, with distinct interfaces, protocols and/or storage formats.

Each data set 324, 326 may have a distinct pattern of change over time. For example, the data set 324 may have a higher rate of change than the data set 326. However, in at least one embodiment, bulk average rates of change insufficiently characterize data set change. For example, the rate of change of the data set 324, 326 may itself have a pattern that varies with respect to time of day, day of week, seasonally including expected bursts correlated with holidays and/or special events, and annually. Different portions of the data set 324, 326 may be associated with different rates of change, and each rate of change "signal" may itself be composed of independent signal sources, for example, detectable with Fourier analysis techniques. Any suitable statistical analysis techniques may be utilized to model data set change patterns including Markov modeling and Bayesian modeling.

As described above, an initial capture 332 of the data set 324 may involve a substantially full copy of the data set 324 and transfer 344 through the network to the high durability data store 322 (may be a "full capture"). In a specific example, this may include taking a snapshot of the blocks that make up a virtual storage volume. Data transferred between the low latency data store 320 and high durability data store 322 may be orchestrated by one or more processes of the BDS service 348. As another example, a virtual disk (storage volume) may be transferred to a physical computer hosting a virtual computer system instance 310. A hypervisor may generate a write log that describes the data and location where the virtual computer system instance 310 writes the data. The write log may then be stored by the high durability data store 322 along with an image of the virtual disk when it was sent to the physical computer.

The data set 324 may be associated with various kinds of metadata. Some, none or all of such metadata may be included in a capture 332, 334, 336 of the data set 324 depending on the type of the data set 324. For example, the low latency data store 320 may specify metadata to be included in a capture depending on its cost of reconstruction in a failure recovery scenario. Captures 334, 336 beyond the initial capture 332 may be "incremental", for example, involving a copy of changes to the data set 324 since one or more previous captures. Changes to a data set may also be recorded by a group of differencing virtual disks which each comprise a set of data blocks. Each differencing virtual disk may be a parent and/or child differencing disk. A child differencing disk may contain data blocks that are changed relative to a parent differencing disk. Captures 332, 334, 336 may be arranged in a hierarchy of classes, so that a particular capture may be incremental with respect to a sub-hierarchy of capture classes (e.g., a capture scheduled weekly may be redundant with respect to daily captures of the past week, but incremental with respect to the previous weekly capture). Depending on the frequency of subsequent captures 334, 336, utilization load on the underlying computing resources can be significantly less for incremental captures compared to full captures.

For example, a capture 332, 334, 336 of the data set 324 may include read access of a set of servers and/or storage devices implementing the low latency data store 320, as well as write access to update metadata, for example, to update a data structure tracking "dirty" data blocks of the data set 324. For the purposes of this description, data blocks of the data set 324 are dirty (with respect to a particular class and/or type of capture) if they have been changed since the most recent capture (of the same class and/or type). Prior to being transferred 344 from the low latency data store 320 to the high durability data store 322, capture 332, 334, 336 data may be compressed and/or encrypted by the set of servers. At the high durability data store 322, received capture 332, 334, 336 data may again be written to an underlying set of servers and/or storage devices. Thus each capture 332, 334, 336 involves a load on finite underlying computing resources including server load and network load. It should be noted that, while illustrative embodiments of the present disclosure discuss storage of captures in the high durability data store 322, captures may be stored in numerous ways. Captures may be stored in any data store capable of storing captures including, but not limited to, low-latency data stores and the same data stores that store the data being captured.

Captures 332, 334, 336 of the data set 324 may be manually requested, for example, utilizing the storage administration interface 316. In at least one embodiment, the captures 332, 334, 336 may be automatically scheduled in accordance with a data set capture policy. Data set capture policies in accordance with at least one embodiment may be specified with the storage administration interface 316, as well as associated with one or more particular data sets 324, 326. The data set capture policy may specify a fixed or flexible schedule for data set capture. Fixed data set capture schedules may specify captures at particular times of day, days of the week, months of the year, and/or any suitable time and date. Fixed data set capture schedules may include recurring captures (e.g., every weekday at midnight, every Friday at 2 am, 4 am every first of the month) as well as one-off captures.

Figure 4:
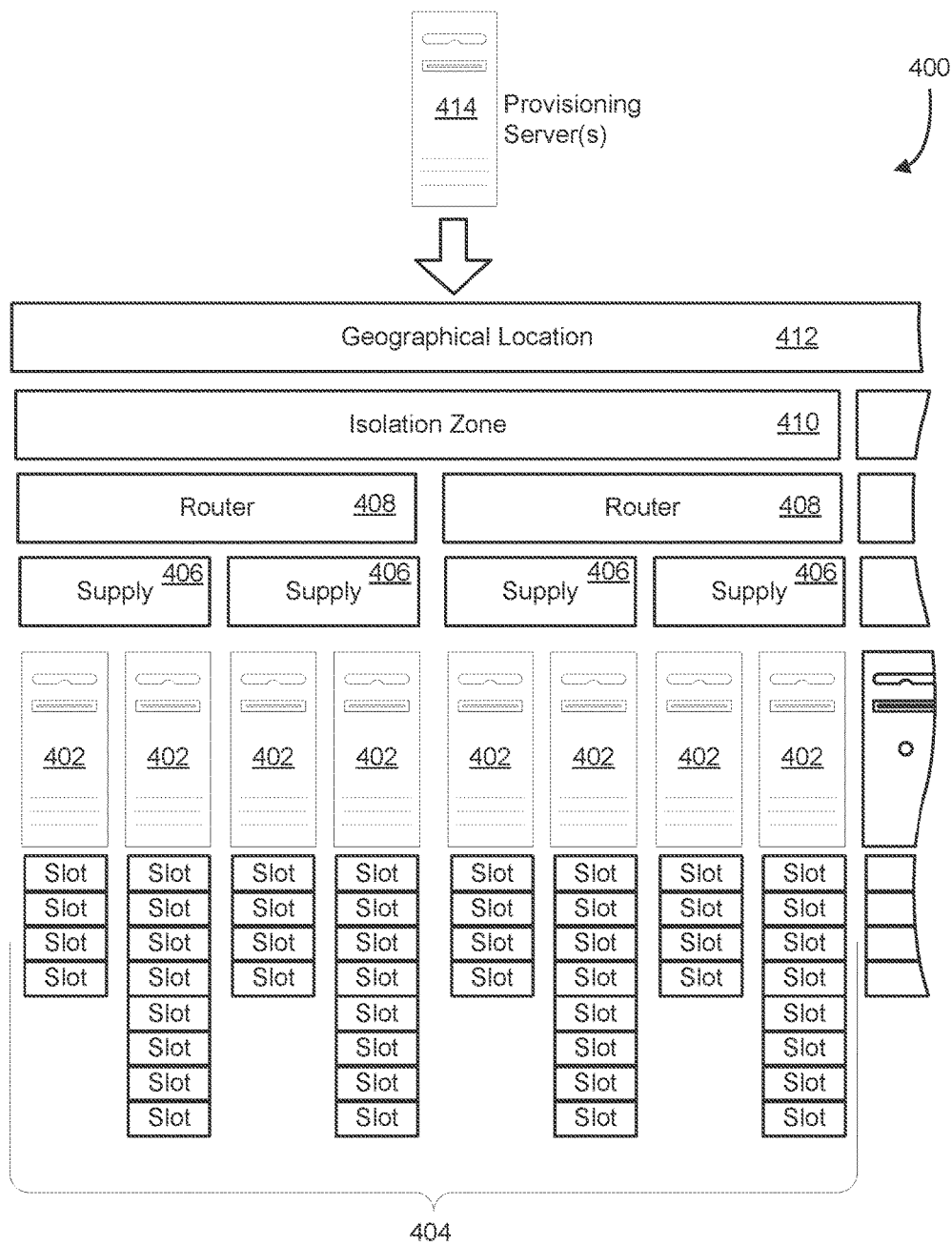
FIG. 4 shows an illustrative example of a data center environment in accordance with at least one embodiment.

A data center 400 may be viewed as a collection of shared computing resources and/or shared infrastructure. For example, as shown in FIG. 4, a data center 400 may include virtual machine slots 404, physical hosts 402, power supplies 406, routers 408, isolation zones 410 and geographical locations 412. A physical host 402 may be shared by multiple virtual machine slots 404, each slot 404 capable of holding a guest operating system. Multiple physical hosts 404 may share a power supply 406, such as a power supply 406 provided on a server rack. A router 408 may service multiple physical hosts 404 across several power supplies 406 to route network traffic. An isolation zone 410 may service many routers 408, the isolation zone 410 being a group of computing resources that are serviced by redundancies such as backup generators. Multiple isolation zones 410 may reside at a geographical location 412, such as a data center 400. A provisioning server 414 may include a memory and processor configured with instructions to analyze user data and rank available implementation resources using determined roles of computing resources and shared resources/infrastructure in the calculation. The provisioning server 414 may also manage workflows for provisioning and deprovisioning computing resources as well as detecting health and/or failure of computing resources.

In some embodiments, a tradeoff between data durability and data latency is determined. In a low-latency data store, as seen in FIG. 3, data durability may be improved by provisioning a slave volume as remotely from a primary volume as possible that also maintains acceptable latency. In some embodiments, a slave volume is a volume that mirrors a primary volume by receiving and performing all writes intended for the primary volume. For example, a primary volume may share a router 408, but not a power supply 406 with a slave volume. If infrastructure supporting a primary volume fails, such as a power supply, a slave volume may become the new primary volume and a new slave may be provisioned. If infrastructure supporting a slave volume fails, such as a physical host 402, a new slave volume may be provisioned. However, if supporting infrastructure of both the primary volume and slave volume fails, such as a router 408, isolation zone 410 and/or geographical location 412 (such as is possible by a major weather event) the volume may be lost unless recovered. In situations, a prior snapshot in the high durability data store may be adequate. However, in other situations, a customer may wish to recover the data on the failed volume. FIGS. 6-9 describe such processes for recovery.

Figure 5:
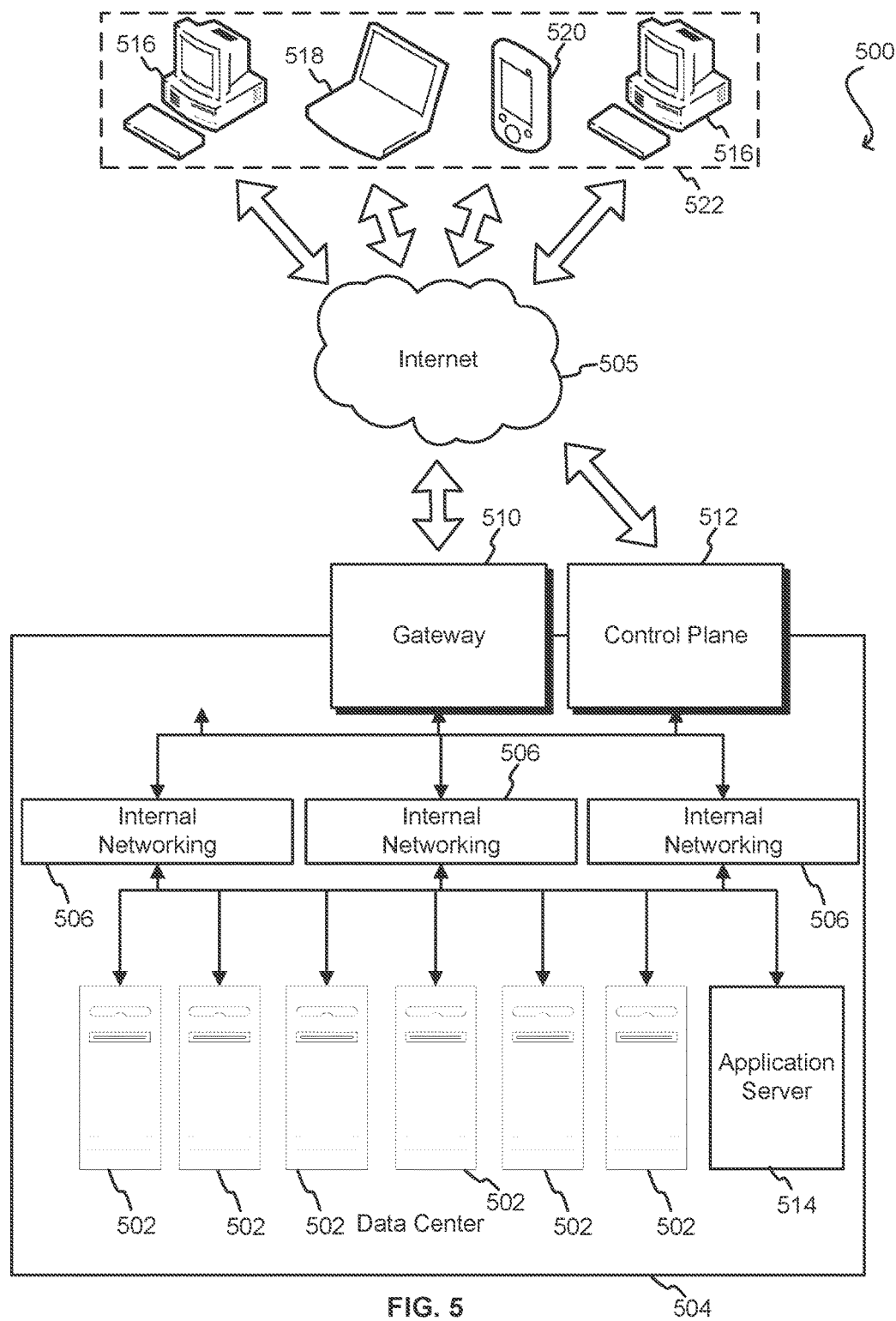
FIG. 5 shows an illustrative example of a service environment in which recovery of a volume may be performed in accordance with at least one embodiment.

FIG. 5 shows an illustrative example of an environment 500 in which recovery of a volume within a data center 504 may be performed in accordance with various embodiments. The computers may be divided into trusted computers within the data center 504 and untrusted computing systems 516, 518, 520 outside the data center 504. Inside the data center 504, computing resources and networking may be under the domain and control of known administrators and thus have trusted internal connections. Outside of the data center 504 may be beyond the control of administrators, and therefore untrusted, such as the Internet 505. Limited communication between computing resources inside the data center 504 and computing systems 516, 518, 520 outside the data center 504 may be allowed to provide services to the computing systems 516, 518, 520. For example, an application server 514 may provide protected streaming video to the computing systems 516, 518, 520 while pulling information from an internal low-latency data store service.

Inside the data center 504 may be internal servers 502, internal networking 506, a control plane 512, a gateway 510 and other resources such as a monitoring system. An internal server 502 may be connected to other internal servers 502 through internal networking 506. The internal servers 502 may also be connected with a control plane 512. The control plane 512 may receive requests to manipulate computing resources, including provisioning resources and changing routing. The internal servers 502 may also be connected with a gateway 510. The gateway 510 may filter and route untrusted traffic to internal servers 502, such as HTTP traffic to Web servers. The application server 514 may communicate with computing resources in the data center 504, such as low latency data stores serviced by internal servers 502.

Outside the data center 504 may be any of a number of different components or environments, as may include the Internet 505 and various untrusted computing systems 516, 518, 520, as may include desktops 516, laptops 518 and mobile devices 520, such as electronic book readers, mobile phones, tablet computing devices, etc. The systems 516, 518, 520 may be untrusted because the systems 516, 518, 520 may not be administered by a trusted administrator. Further, the communication channels, such as the Internet, are not controlled by a trusted administrator. Thus, a message from an untrusted computing system 516, 518, 520 may be intercepted, counterfeited and/or exploited.

In some cases, and for protective reasons, internal servers 502 on a secure internal network may only be given the Internet access required to operate, if any at all. For example, an application server 514 in a data center 504 may only receive outside traffic on port 80 because a gateway 510 provides access controls to the secure internal network that prevents all other Internet traffic from directly reaching the Web server. In another example, a database server on a secure internal network may not be connected to the Internet because it is only queried by a local Web server over the secure internal network. In other embodiments, an internal server 502 may be behind a load balancer, which may occasionally direct Internet requests to the internal server 502. In another example, a low-latency data store server may be configured to act as a block storage device to an application server 514, but have no Internet access.

There may also be other reasons to prevent direct access to servers within the data center 504. Some data center operators and clients consider how the internal data center 504 operates a trade secret. Knowledge of machines, configurations or interfaces may be seen as a competitive advantage. By keeping that information only within the trusted network, the trade secrets may be kept from others. However, by preventing access to internal servers 502 within the data center 504 from outside sources, any communication to internal servers 502 must come from within. Thus, it may be difficult to reach an internal server 502 or interact with internal services in other than defined ways.

Figure 6:
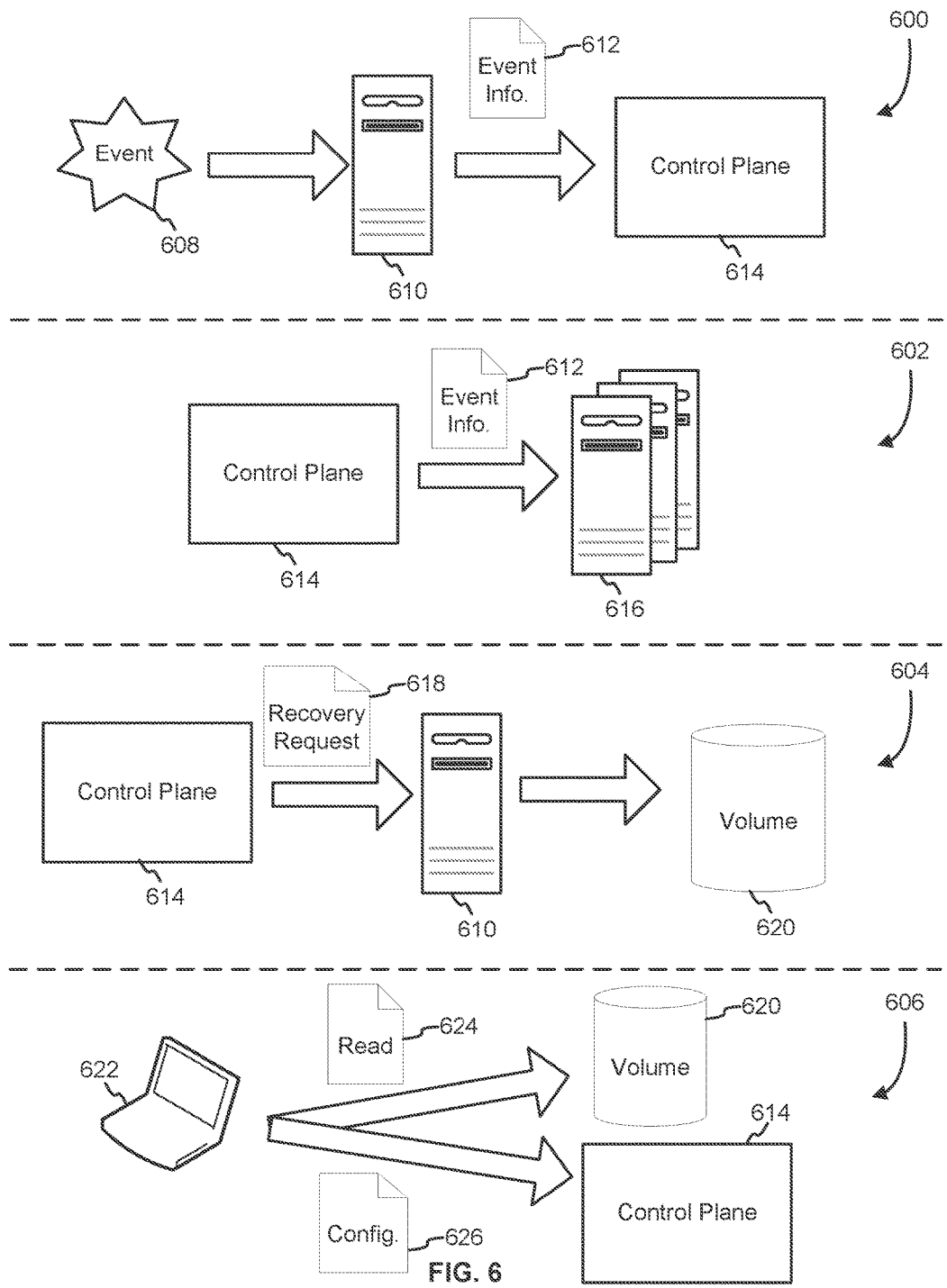
FIG. 6 shows an illustrative chart of a process that may be used to recover a volume in accordance with at least one embodiment.
Figure 7:
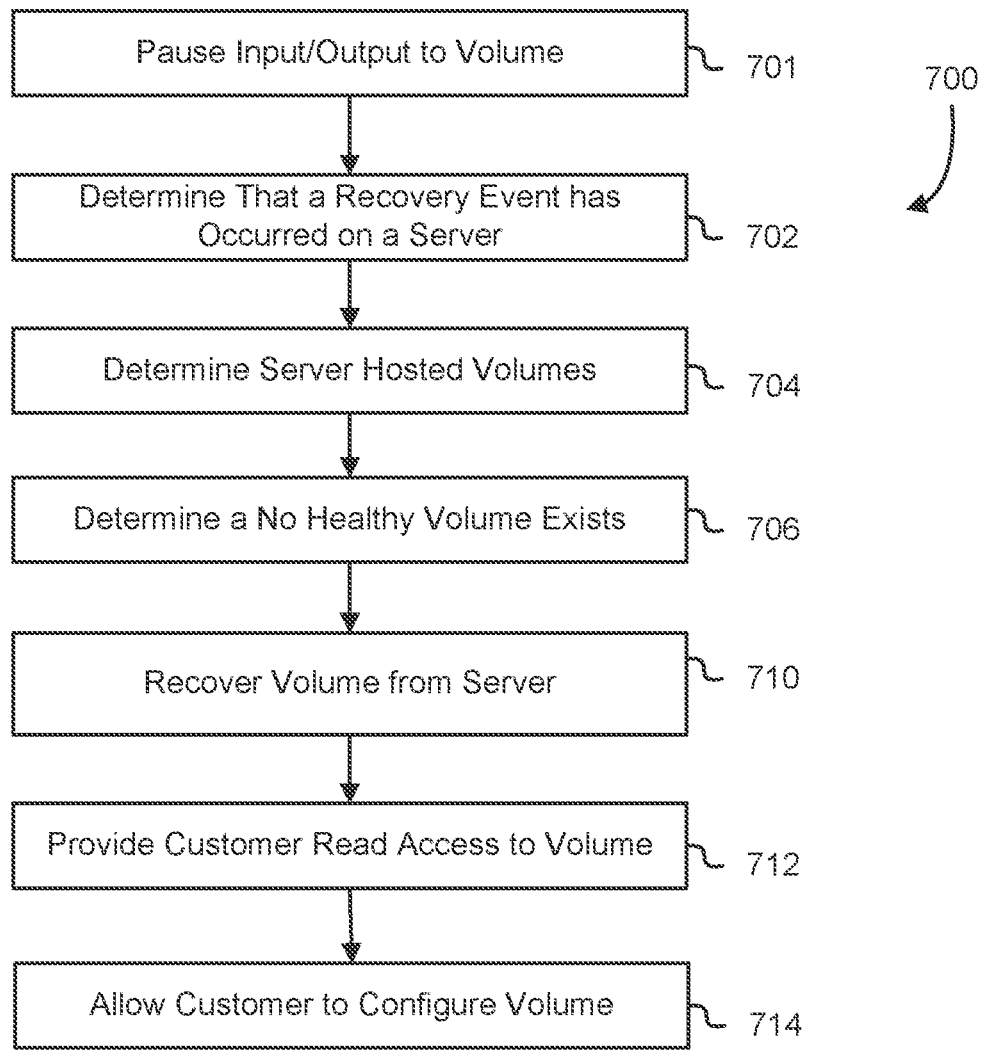
FIG. 7 shows an illustrative example of a process that may be used to recover a volume in accordance with at least one embodiment.

Turning now to FIG. 6 an illustrative chart of a process in phases 600, 602, 604, 606 that may be used to recover a volume in accordance with at least one embodiment is shown. These phases 600, 602, 604, 606 may be performed by systems such as those shown in FIGS. 1 and 2, including control plane 234, volume 208 and storage server 202. The recovery process may include four phases: notice 600, investigation 602, recovery 604 and configuration 606. In the notice phase 600, an event 608 occurs that causes a storage server 610 to report the event information 612 to a control plane 614. For example, a power outage event 608 may cause a block storage server 610 to reboot. Upon reboot, the block storage server 610 may report the reboot event information 612, including a list of local volumes, to the control plane 614 and request instructions on what to do with the volumes.

In the investigation phase 602, the control plane 614 may use the event information 612 to determine if the volumes hosted by the storage server 610 are already hosted by other storage servers 616. For example, the control plane 614 may check to see if both a primary and slave volume were affected by the event 608. If only one of the primary or slave volumes were affected, the system would have already created a new slave volume to replace the volume affected by the event 608. No recovery would be needed. If recovery has already occurred through a mirrored volume, then no recovery may be necessary. If no recovery occurs, then the storage server 610 may drop the volumes and resume offering storage services. However, if both the primary and slave volume were affected and no recovery has occurred (or is incomplete) the control plane 614 may determine that the recovery phase 604 should occur.

In the recovery phase 604, the control plane 614 may send a recovery request 618 to the storage server 610 identifying a volume 620 to recover. The recovery request 618 may also include instructions to drop volumes that do not need to be recovered. In some embodiments, recovery may include only the volume itself, such as error correction and/or marking the volume as read-only. In other embodiments, the control plane 614 and/or storage server 610 may use multiple volumes to form a recovered volume. For example, a primary and slave volume may be examined together to verify that the data matches and/or remove corruption from one or both volumes. In another example, a snapshot may be restored and a comparison performed with the snapshot to determine any changes that may be applied to the snapshot in view of the restored data. The restored volume may then be ready for a configuration phase 606. In some embodiments, if the control panel discovers the volume has no data-loss, the control panel 614 may re-enable the volume 620 without any user intervention and the configuration phase 606 may be skipped.

In the configuration phase 606, a customer may review and/or verify the data contained in the restored volume 620 and configure the use of the restored volume 620 through the control plane 614. For example, a customer may be notified of the event 608 and the restored volume 620 awaiting review. The customer may access the volume through a computing device such as laptop 622. The customer may use the read access 624 to the volume 620 to verify the contents of the volume 620. Depending on the customer need, the customer may configure the volume through the control plane. Configuration may include re-enabling the volume for use, transferring the volume to another data center, archiving the volume and/or deleting the volume Turning now to FIG. 7, an illustrative example of a process 700 that may be used to recover a volume in accordance with at least one embodiment is shown. The process 700 may be performed by systems such as those shown in FIGS. 1 and 2, including control plane 234, volume 208 and storage server 202. A recovery event may occur that causes the input/output requests to a volume to be paused 701. A server and/or control plane may determine 702 that a recovery event has occurred on the server. For example, a recovery event could include an unexpected shutdown or power loss detected at boot time. In another example, a loss of networking services may be a recovery event that is detected by the lack of network presence (such as electrical or packet loss). The server hosted volumes may then be determined 704. A volume may be determined 706 to have no healthy volumes available. The volume may be recovered 710 from the server and/or secondary sources. A customer that manages the data may be provided 712 read access to the volume. The control plane may then receive instructions from the customer on configuring 714 the volume.

For example, a power outage may be noted by a server. The server may then provide a list of hosted volumes to a control plane. The control plane may determine that the volume is not available through other redundancies and pause input/output requests to the volume. The control plane may then request the server restore the volume in a read-only state. The control panel may then grant read-only access to the customer that is not affected by the pausing of input/output requests. The customer may then access the volume and configure the fate of the volume by re-enabling the volume for use, archiving the volume, deleting the volume or doing nothing. In some embodiments, in the case of doing nothing, the control plane may automatically cause the volume to be archived. In other embodiments, the server may also resume hosting volumes during the recovery process, reducing downtime of the server.

Some or all of the process 700 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

Figure 8:
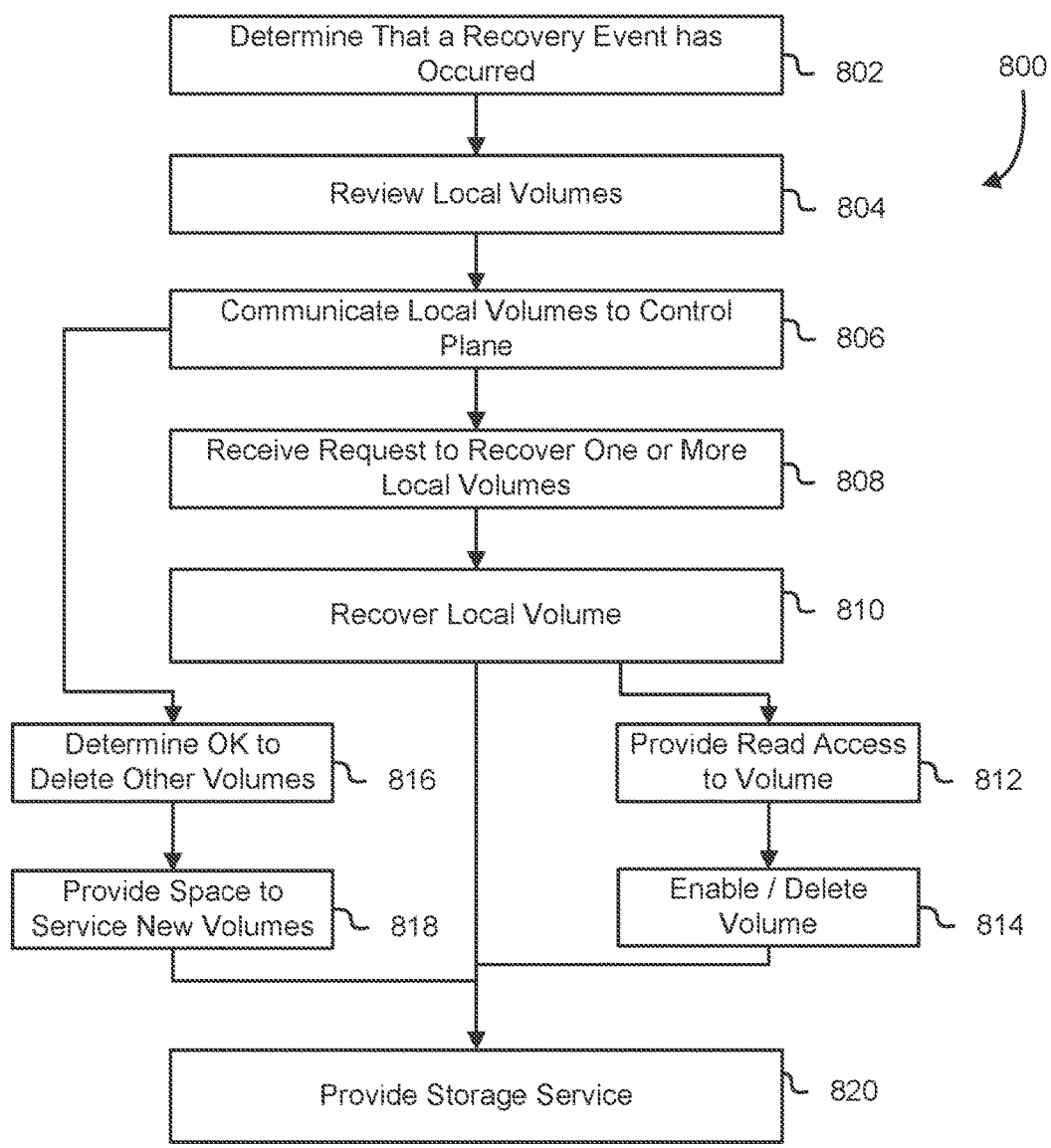
FIG. 8 shows an illustrative example of a server process that may be used to recover a volume in accordance with at least one embodiment.

Turning now to FIG. 8, an illustrative example of a server process 800 that may be used to recover a volume in accordance with at least one embodiment is shown. The process 800 may be performed by systems such as those shown in FIGS. 1 and 2, including control plane 234, volume 208 and storage server 202. The storage server may determine 802 that a recovery event has occurred, such as a network outage. The storage server may review 804 local volumes to verify volume identification and/or volume health (such as an amount of corruption or other problems). The storage server may periodically attempt to communicate 806 the local volume information to a control plane. While waiting for a determination on recovering volumes, the storage server may determine 816 other non-identified local volumes may be deleted, provide 818 the recently acquired space as available for new volumes and resume providing 820 storage services. Upon successful communication about recovery, the storage server may receive 808 a request to recover one or more local volumes. The server may recover 810 local volumes. In some cases, recovery may be simply retaining the volume. In parallel, the storage server may delete non-retained volumes 816, 818, resume providing storage services 820 and service the restored volume 812, 814. The storage server may also resume providing 820 storage services. In addition, the storage server 812 may provide read-only access to the recovered volume and eventually enable or delete 814 the recovered volume depending on customer input (or lack thereof).

Figure 9:
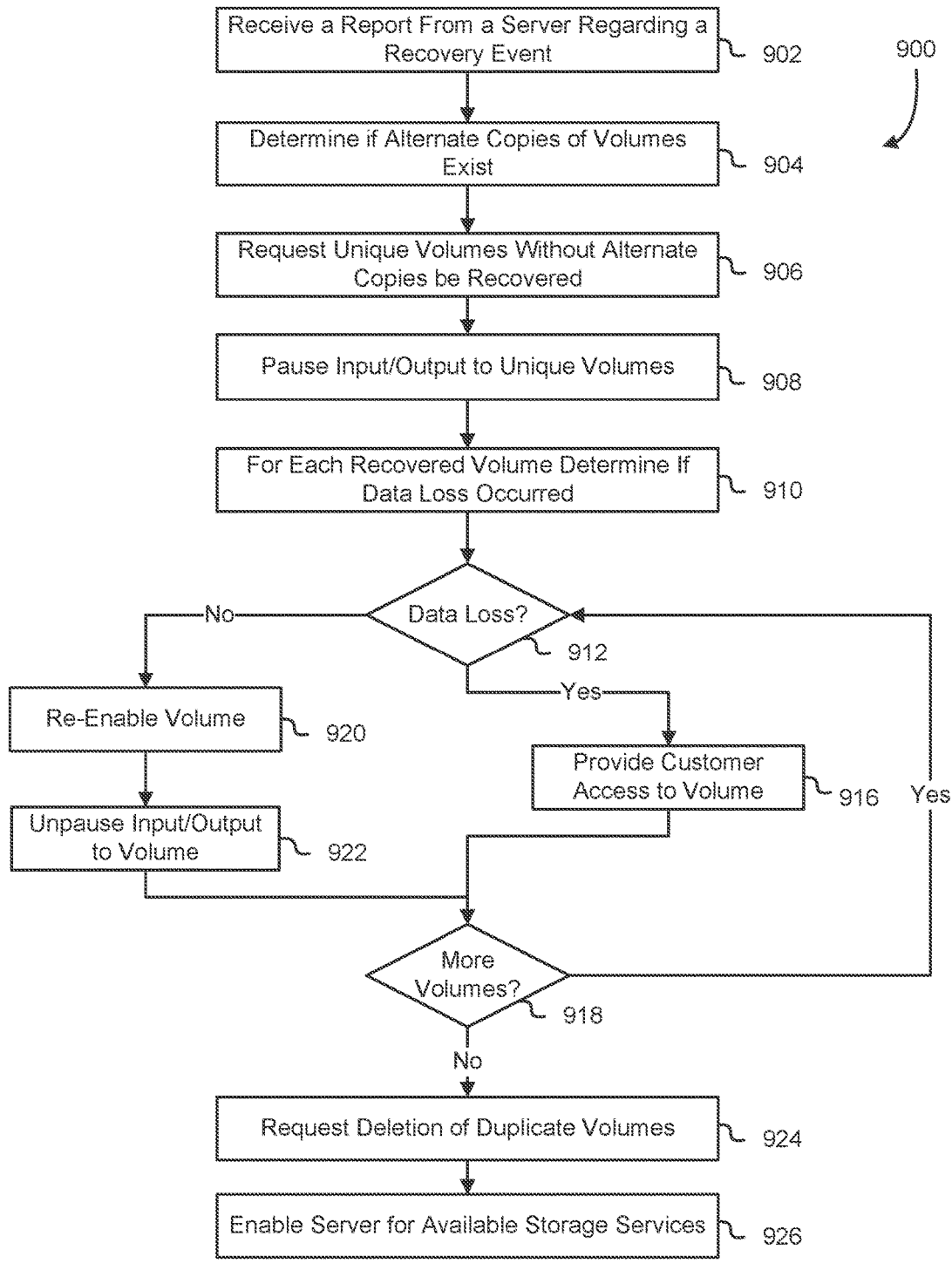
FIG. 9 shows an illustrative example of a control plane process that may be used to recover a volume in accordance with at least one embodiment.

Turning now to FIG. 9, an illustrative example of a control plane process 900 that may be used to recover a volume in accordance with at least one embodiment is shown. The process 900 may be performed by systems such as those shown in FIGS. 1 and 2, including control plane 234, volume 208 and storage server 202. The control plane may receive 902 a report from a server identifying a recovery event and associated volumes. The control plane may determine 904 if active copies of the volume exist or if, instead, the volumes are unique. If unique, the control plane may request 906 the unique volumes be recovered and pause 908 input/output requests to the unique volumes. For each recovered volume, the control plane may determine 910 if data loss has occurred. If no data loss 912, the control plane may re-enable 920 the volume, unpause the input/output requests to the volume 922 and review remaining volumes 918. If there was data loss 912, the control plane may arrange for access to the volume be provided 916 to the customer administering the volume and review further volumes 918. Volumes not identified as unique may be considered duplicates and a request to delete 924 the volumes may be given. The storage server may also be enabled 926 to continue to provide storage services. By enabling the storage system to only quarantine the recovered volumes, data centers with massive events may become operational at a much quicker pace rather than waiting for individual intervention on each server. It should also be noted that operations 924 and 926 may be performed in series with the other operations as shown, or may be performed in parallel with other operations, depending on the embodiment.

Figure 10:
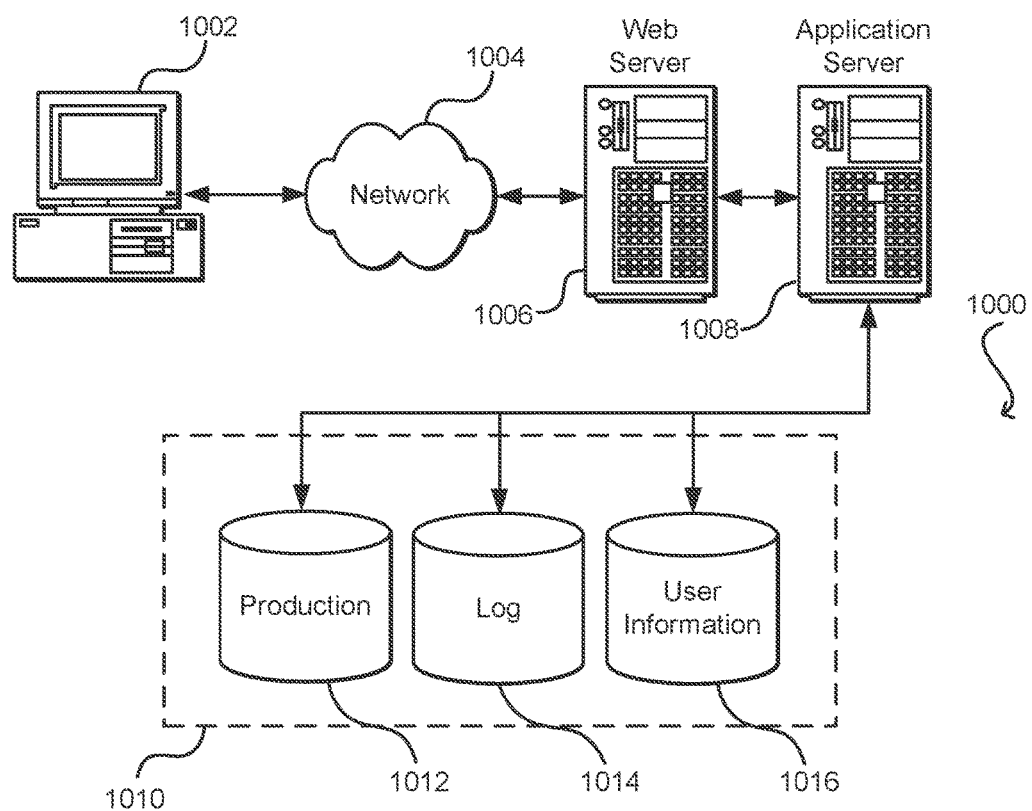
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method for volume recovery, comprising:
    initiating a recovery of volumes of a storage server based at least in part on an event that has interrupted operation of the storage server;
    receiving a first indication that a first volume from the volumes comprises first client data that is unavailable from remaining volumes on at least one storage server unaffected by the event, the first indication received based at least in part on information about the volumes;
    receiving a second indication that a second volume from the volumes comprises second client data that is available from at least one of the remaining volumes of the at least one storage servers unaffected by the event, the second indication received based at least in part on the information about the volumes;
    removing the second volume from the volumes based at least in part on the second indication; and
    recovering the first volume based at least in part on the first indication.

2. The computer-implemented method of claim 1, wherein providing the information about the volumes comprises:
    sending, based at least in part on the event, identifiers of the volumes and information about transitioning into a recovery mode; and
    receiving a recovery request based at least in part on the identifiers and the information about transitioning into the recovery mode, the recovery request comprising the first indication of the first volume and instructions to delete the second volume.

3. The computer-implemented method of claim 1, wherein recovering the first volume comprises: providing read-only access to the first volume.

4. The computer-implemented method of claim 3, further comprising:
    enabling storage services to the volumes of the storage server while the first volume is recovering.

5. The computer-implemented method of claim 3, further comprising:
    deleting the second client data from the second volume; and
    providing write access to the second volume.

6. The computer-implemented method of claim 1, wherein recovering the first volume comprises:
    taking a snapshot of the first volume; and
    sending the snapshot to storage.

7. The computer-implemented method of claim 1, wherein recovering the first volume comprises:
    pausing pending input/output (I/O) requests to the first volume;
    determining whether the first client data from the first volume was lost or corrupted based at least in part on the event; and
    enabling usage of the first volume based on the determining of whether the first client data was lost or corrupted.

8. The computer-implemented method of claim 7, wherein enabling usage of the first volume comprises unpausing the I/O requests to the first volume based at least in part on a determination that no data from the first volume was lost or corrupted.

9. The computer-implemented method of claim 7, wherein enabling usage of the first volume comprises, based at least in part on a determination that data from the first volume was lost or corrupted:
    updating the first volume based at least in part on an update received from a client; and
    unpausing the I/O requests to the updated first volume based at least in part on an approval from the client to start usage of the updated first volume.

10. A computer system for volume recovery, comprising:
    a plurality of storage hosts;
    one or more processors; and
    one or more non-transitory computer-readable storage media storing instructions that, upon execution with the one or more processors, cause the computer system to at least:
        receive information about volumes of a storage host of the plurality of storage hosts based at least in part on a recovery event that has interrupted operation of the storage host;
        determine, based at least in part on the information about the volumes, that a first volume from the volumes comprises first client data available only from the first volume and that a second volume from the volumes comprises second client data available from another storage host of the plurality of storage hosts, the other storage host unaffected by the recovery event; and
        request the storage host to recover the volumes by at least removing the second volume from the volumes and recovering the first volume.

11. The computer system of claim 10, wherein determining that the first volume comprises the first client data and that the second volume comprises the second client data comprises:
    receiving, from the other storage host, identifiers of the volumes hosted on the other storage host; and
    identifying the first volume and the second volume based at least in part on a comparison of the identifiers and the information about the volumes of the storage host.

12. The computer system of claim 10, wherein the volumes are recovered by at least:

enabling storage services to the volumes while the first volume is recovering.

13. The computer system of claim 10, wherein the volumes are recovered by at least:
   pausing read or write requests to the first volume such that the read or write requests are delayed until receiving a determination from a client of whether the read or write requests are denied or approved.

14. The computer system of claim 10, wherein the volumes are recovered by at least:
   deleting the second volume; and
   offering storage space corresponding to the second volume for use.

15. The computer system of claim 10, further comprising providing administrative read-only access to the volumes based at least in part on pausing input/output requests to the volumes.

16. The computer system of claim 10, wherein further comprising:
   notifying a client of the recovery event;
   granting the client access to the first volume based at least in part on the first volume being recovered; and
   providing an interface for the client to enable input/output requests to the first volume.

17. One or more non-transitory computer-readable storage media storing instructions that, upon execution with one or more processors, cause a computer system to perform operations comprising:
   receiving information about volumes of a storage host, the information received based at least in part on a recovery event that has interrupted operation of the storage host;
   determining, based at least in part on the information about the volumes and data communication with another storage host, that a first volume from the volumes comprises first client data available only from the first volume and that a second volume from the volumes comprises second client data available from the other storage host, the other storage host unaffected by the recovery event; and
   requesting the storage host to recover the first volume and remove the second volume from a recovery of the volumes.

18. The one or more non-transitory computer-readable storage media of claim 17, wherein the operations further comprise generating a replica volume of the first volume and storing the replica volume on the other storage host.

19. The one or more non-transitory computer-readable storage media of claim 17, wherein requesting the storage host to recover the first volume comprises requesting the storage host to provide read-only access to the first volume, and wherein requesting the storage host to remove the second volume comprises requesting the storage host to delete the second volume and enable read and write access to a storage space corresponding to the second volume.

20. The one or more non-transitory computer-readable storage media of claim 17, wherein requesting the storage host to recover the first volume comprises:
   forming a recovery volume that comprises the first volume from the storage host and a third volume from the other storage host; and
   requesting the storage host to recover the recovery volume.

* * * * *